(No Model.) 2 Sheets—Sheet 1.

E. L. FERGUSON.
PNEUMATIC TIRE FASTENER.

No. 542,336. Patented July 9, 1895.

WITNESSES:
Britt A. Cox
Jennie E. Weller

INVENTOR:
Ernest L. Ferguson
by Fred W. Hersey
Atty.

(No Model.) 2 Sheets—Sheet 2.

E. L. FERGUSON.
PNEUMATIC TIRE FASTENER.

No. 542,336. Patented July 9, 1895.

WITNESSES:
Jennie E. Weller
W. W. Nicholl

INVENTOR:
Ernest L. Ferguson
by Fred N. Herse
Atty

UNITED STATES PATENT OFFICE.

ERNEST L. FERGUSON, OF CHICAGO, ILLINOIS.

PNEUMATIC-TIRE FASTENER.

SPECIFICATION forming part of Letters Patent No. 542,336, dated July 9, 1895.

Application filed October 10, 1894. Serial No. 525,535. (No model.)

*To all whom it may concern:*

Be it known that I, ERNEST L. FERGUSON, a citizen of the United States, residing at Chicago, in the county of Cook and State of Illinois, have invented a certain new and useful Pneumatic-Tire Fastener, of which the following is a specification.

My invention relates more particularly to pneumatic tires as used on bicycles, but it is not limited to that use.

It also relates more particularly to pneumatic tires which are composed of two parts—that is, an outer casing or covering and an inner tube or air-tube. The description in the specification will relate more particularly to these two classes.

The objects of my invention are to have a means of attaching the pneumatic tire to the rim of a wheel without cementing it on, and which will also prevent the tire from "creeping" or moving on said rim; also to provide a means for closing the slit in the outer casing of said tire other than by lacing each time it has been opened, as is now done; also to provide a means of attaining these objects, which may be applied to the now-existing tires or the tires now in use, with but little or no alteration to said tires. I accomplish these objects by the means illustrated in the accompanying drawings, in which—

Figure 1:
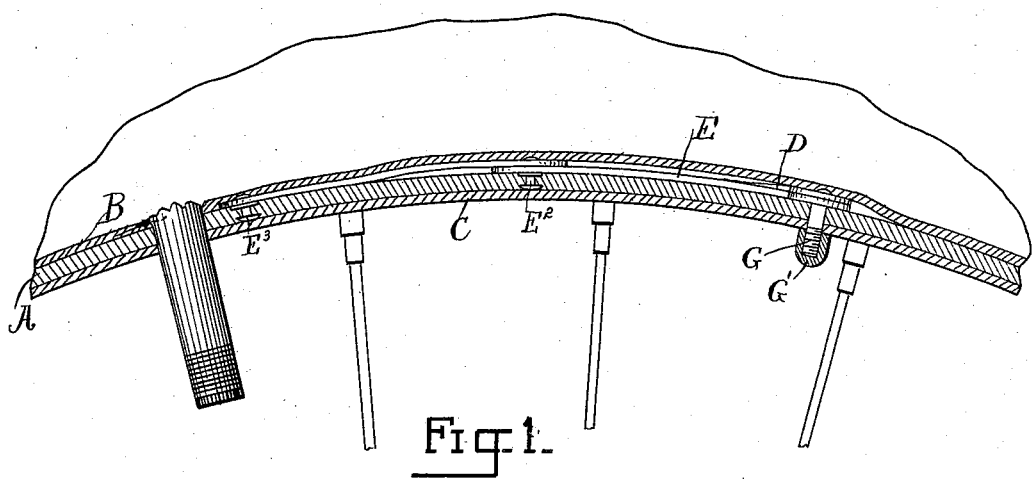
Figure 2:
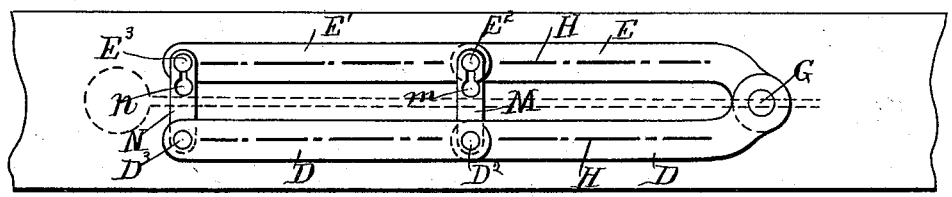
Figure 3:
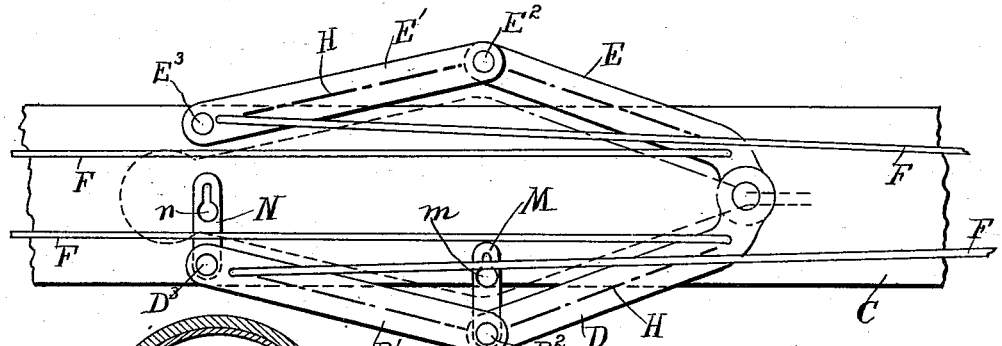
Figure 4:
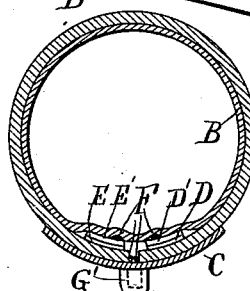
Figure 5:
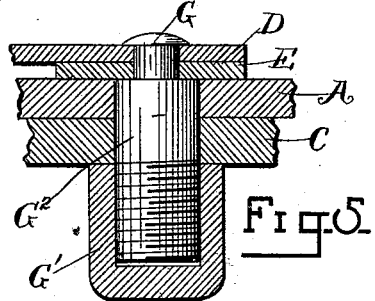
Figure 6:
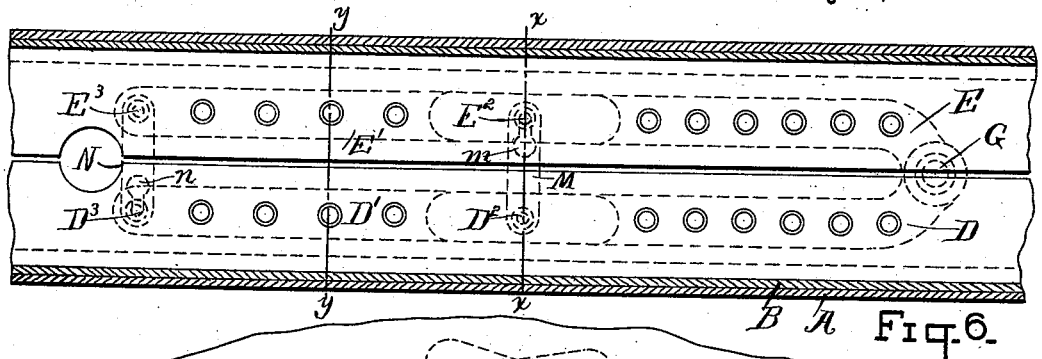
Figure 7:
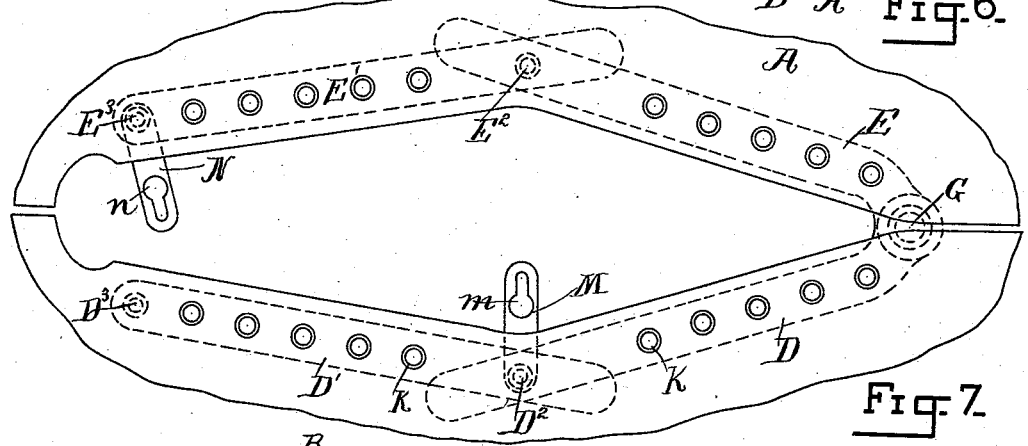
Figure 8:
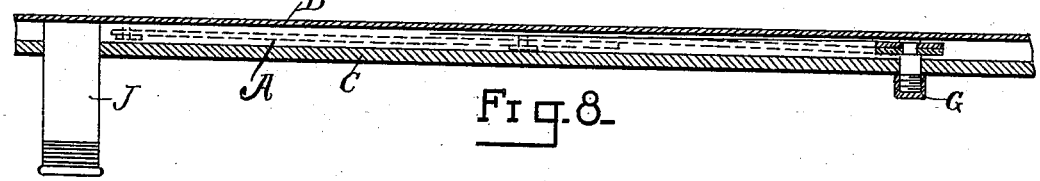
Figures 9, 10:
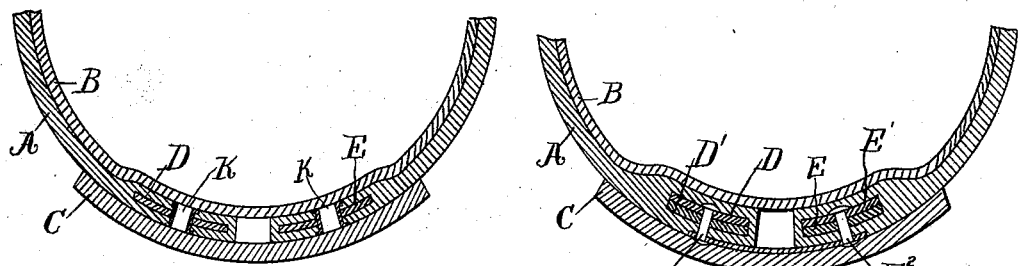
Figure 11:
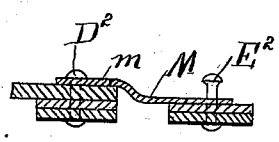

Figure 1 is a longitudinal vertical section of a portion of a pneumatic tire and a portion of the rim of a bicycle-wheel, showing my fastener in elevation and its preferable relation to the outer casing and inner tube of said pneumatic tire. Fig. 2 is a plan of my fastener, showing the slit in the outer casing in dotted lines. Fig. 3 shows a plan of my fastener in modified form, using wires to bind the tire onto the rim of the wheel. This view shows the fastener in an opened position. Fig. 4 is a section of Fig. 3, showing the relation of the fastener and wires to the outer casing and inner tube of the pneumatic tire. Fig. 5 is a detail view of the fastening-stud of the fastener, which stud secures the fastener to the rim of the wheel. Fig. 6 is a plan of my fastener, showing a means of application when it is inclosed in the outer casing. Fig. 7 is a plan view, as Fig. 6, with the fastener opened to the position required to remove the inner tube. Fig. 8 is a central longitudinal section through the fastener, as shown in Fig. 6. Fig. 9 is a section on the line $x\,x$ of Fig. 6. Fig. 10 is a section on the line $y\,y$ of Fig. 6. Fig. 11 is a detail view of the locking-link which fastens the two series of the fastener together.

Similar letters refer to like parts in the various views of the drawings.

My invention is composed of two series or sets of thin narrow metal plates jointed or pivoted at required intervals and the series hinged or pivoted at one end and preferably having the stud forming the hinge or pivot pass through and fasten to the rim of the wheel by a nut. I have provided a "hooking-link," so called, which I use in locking the two series of the fastener together when it is closed or in position of use, thus preventing any liability of its springing open.

In the drawings, A represents the outer casing of the pneumatic tire and has in it the ordinary slit for removing the inner or air tube.

B represents the inner or air tube, and is made in the ordinary form.

C is the rim of a bicycle-wheel, to which the pneumatic tire is fastened.

D D' E E' are the four pieces of metal forming the two series or parts of my fastener. These are preferably made of thin narrow plates, but any other substance found desirable may be used, the object being to have each part stiff, yet light. The parts D and E are pivoted together by the stud G, which stud, having on its lower end a screw-thread, is passed through a hole in the rim of the wheel and the nut G screwed on it till said stud is firmly attached to said rim. This attachment is shown in detail in Fig. 5 of the drawings. To the parts D and E are attached the parts or plates D' and E' by means of the rivets or studs $B^2$ and $E^2$, the ends of which rivets or studs are extended to allow the fastening to them of the hooking-link M and also of the outer casing. The outer ends of the parts D' and E' are provided with studs or pins $D^3$ and $E^3$, to which the hooking-link N is fastened. The two pieces D and D' on one side and E and E' on the other form the two so-called "series."

It is not my desire to limit myself to simply two pieces on each side, but any convenient number may be used, the number shown being ample to illustrate my invention and for all practical purposes.

This fastener is laced, preferably, to the inside of the outer casing, one series on each side of the slit in said casing, by the lacing-strings H, which pass through said outer casing and said plates, thus attaching the fastener to the inside of the outer casing. Rivets may be used, if found convenient, and are illustrated and preferable where the fastener is inclosed in the edge of the outer casing, but lacing is preferred for tires now in use.

M and N represent the hooking-links for fastening the two series of my fastener together. These are made of a thin piece of metal and have at one end a slot with an enlarged portion, as illustrated in the drawings by $m$ and $n$. These locking-hooks are attached to the pivots or studs $D^2$ $E^3$, and the slots $m$ and $n$ hook over the studs $E^2$ and $D^3$ of the opposite series, respectively.

I have illustrated the locking-hooks as alternated, but they may be placed all on one side and hook on the studs on the opposite side as well, as I do not limit myself to any particular location of hooks.

In operating this device in connection with a pneumatic tire the fastener is laced to the inside of the outer casing of the tire, one series on each side of the slit in said casing. The fastener is spread and the inner tube inserted, when the fastener is closed and hooked. The casing is then placed on the rim of the wheel, so that the pivot-stud G may pass through the hole in said rim, when the nut G is screwed onto said stud until it presses against the rim of the wheel, thus fastening said stud securely to said rim, and in so doing attaching the fastener, which in turn will hold the tire firmly in place on the rim of the wheel and prevent a creeping movement on said rim. In order to remove the inner or air tube from the outer casing for repair, or whatever else, the nut is removed from the stud and said stud loosened from the rim of the wheel, when the outer casing may be removed from said rim, the locking-hooks unfastened, and by spreading the fastener the inner tube exposed, and may be readily removed.

In the modification illustrated by the views, Figs. 3 and 4, the fastening-stud is omitted and in its place the wires F are used. These wires are attached to the fastener, as illustrated, one set of ends being attached near the pivot end and the other set at the opposite end of the fastener. The wires pass entirely around the tire between the inner tube and the outer casing. To attach the tire on the rim the fastener is closed together from the position illustrated in Fig. 3, and in so doing the wires will be tightened and bind said tire to the rim. The fastener when closed is hooked, as before described.

In attaching the fastener to the outer casing, as illustrated in Figs. 6, 7, 8, 9, and 10, said fastener is placed in the edge of the outer casing on each side of the slit and riveted, though the rivets may be dispensed with, if desired. Its position and relation are clearly illustrated by the drawings. The locking-hooks may be used in this as in the other forms.

I do not wish to limit myself to any particular form of locking-hooks; but my object is to provide a hooking attachment fastening to the pivots or studs, which may be readily fastened and unfastened and which will hold the two series securely together when so fastened.

Having thus described my invention, what I desire to claim and to secure by Letters Patent is—

1. A pneumatic tire fastener, composed of two series of pivotally connected narrow plates so arranged that the series are pivotally connected at one end and that each member of one series is opposite its corresponding member of the other series, in combination with locking hooks fastened to one series and hooking over pins or studs in the opposite series in such a manner that the two series are held firmly together when so attached all as set forth and described.

2. A pneumatic tire fastener, composed of two series of pivotally connected narrow plates, attached to the outer casing of said tire at the slit in said casing and so arranged that the two series are pivotally connected with each other at one end by a stud which passes through and is attached to the rim of the wheel, all substantially as and for the use set forth.

3. A pneumatic tire fastener, composed of two series of pivotally connected narrow plates, attached to the outer casing of said tire on each side of the slit in said casing and so arranged that the two series are pivotally connected with each other at one end by a stud which passes through and is attached to the rim of the wheel, in combination with locking hooks so attached to one of said series of plates that they will hook over pins or studs in the opposite series in such a manner that the two series of plates will be held firmly together, all as set forth and described.

4. A pneumatic tire fastener, composed of the two arms "D" and "E:" the stud "G" forming a pivot for said arms to swing on: the extension pieces "D'" and "E'" pivotally fastened near the ends of the pieces "D" and "E:" and the locking hooks "M" and "N" so fastened and arranged as to lock and fasten said pieces together, all as is set forth and described.

5. In a pneumatic tire fastener composed of two series of plates pivotally connected with each other, a locking hook or hooks fastened to one series and so arranged as to hook over pins or studs in the opposite series in such a manner that the two series are held firmly together, when said hook or hooks are so attached, all as set forth and described.

ERNEST L. FERGUSON.

Witnesses:
 FRED W. HERSEY,
 E. G. LANCASTER.